Dec. 23, 1930.    W. E. WINE    1,786,378
SIDE BEARING
Filed March 1, 1927    2 Sheets-Sheet 1
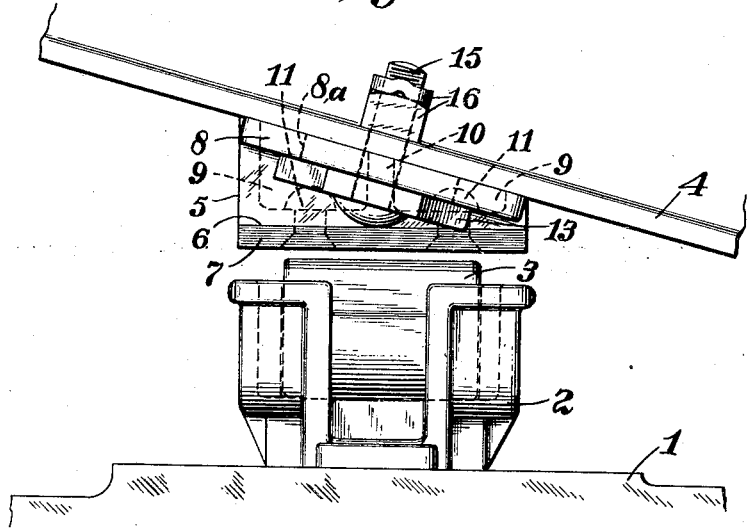
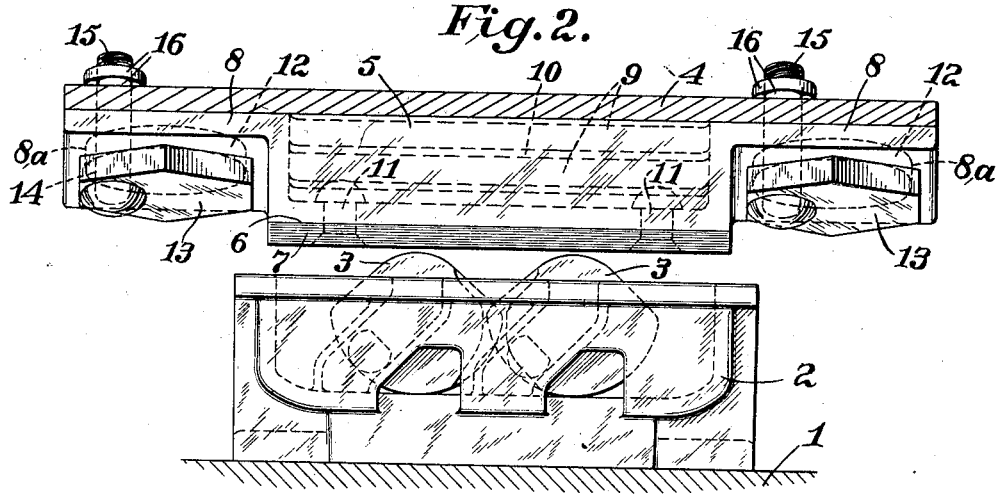
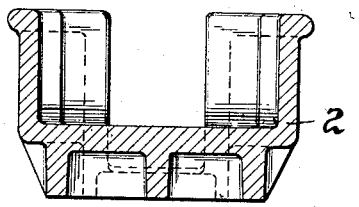
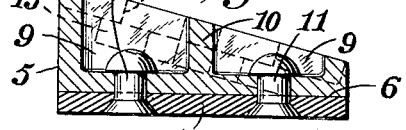
Inventor:
William E. Wine,
by Parker Cook.
Atty.

Dec. 23, 1930.  W. E. WINE  1,786,378
SIDE BEARING
Filed March 1, 1927  2 Sheets-Sheet 2
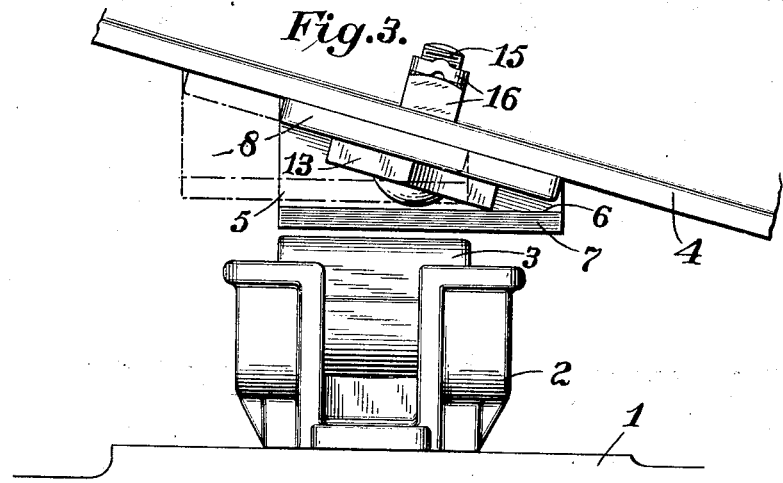
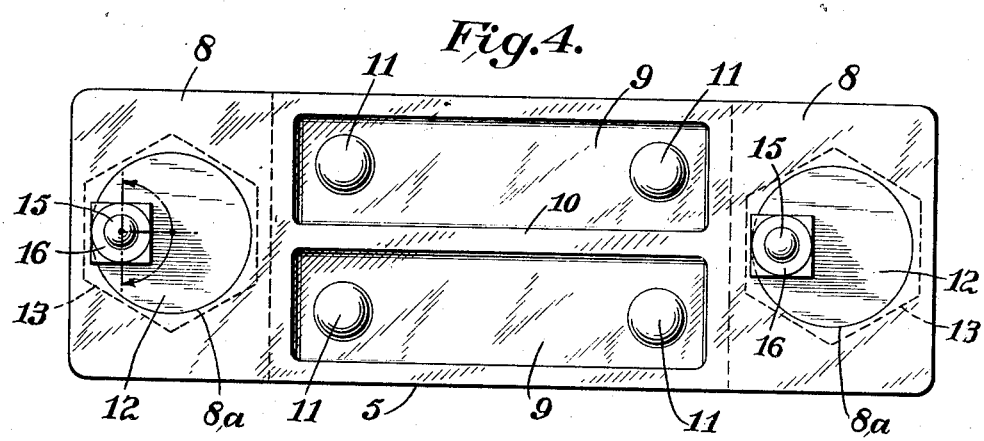
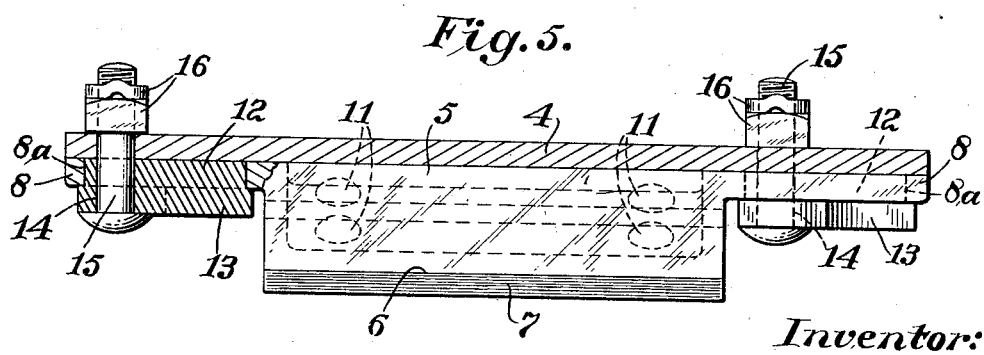
Inventor:
William E. Wine,
by Parker Cook
Atty.

Patented Dec. 23, 1930

1,786,378

UNITED STATES PATENT OFFICE

WILLIAM E. WINE, OF TOLEDO, OHIO

SIDE BEARING

Application filed March 1, 1927. Serial No. 171,758.

My invention relates to new and useful improvements in side bearings and more particularly to the body bolster portion of the bearing and has for an object to provide a bearing wherein the body bolster bearing may be adjusted to suit the conditions under which the bearing is operating.

The present application is a companion case to one filed by me on February 23rd, 1927, and bearing Serial Number 170,389, U. S. Patent No. 1,664,445, April 3, 1928.

Another object of the present invention is to provide a side bearing wherein the housing with the rollers therein will be securely mounted on the truck bolster but wherein the body bolster bearing is adjustably mounted on the body bolster.

As it is well known to those skilled in the art, certain clearances between the rollers and the wearing plate of the body bolster should be provided, but due to the fact that the truck or body bolster sometimes slightly settles after use, the proper clearances are not maintained between the several parts of the bearing.

Furthermore, certain tolerances are allowed in the center plate on the truck bolster and again irregularities occur in the center plate on the truck bolster, so that unless some form of adjustable means is provided, the clearances between the rollers and the body bearing will not always be the proper ones.

Another object, therefore, of the invention is to provide a very simple form of side bearing wherein the body bolster bearing is to be attached to the body bolster along its inclined lower surfaces and whereby with the releasing of two bolts, the body bearing may be adjusted along this slope of the body bolster to thereby provide the proper clearance between the wear plate and the rollers.

Still another object of my invention is to provide the body bolster bearing with two eccentrically positioned bolts, so that on the loosening of these bolts, the eccentric heads in which the bolts are mounted, may be slightly turned to thereby move the body bolster bearing inwardly or outwardly over the rollers until the proper clearance is obtained between these rollers and the said body bearing.

With these and other objects in view, the invention consists in certain new and novel arrangements and combination of parts, as will be hereinafter more fully described and pointed out in the claim.

Referring now more particularly to the drawings,

Fig. 1 is an end elevation showing the respective positions of the body bolster bearing and the truck bearing.

Fig. 2 is a side elevation of the same, the portion of the bolster being shown in section.

Fig. 3 is a view similar to Fig. 1, but showing the relative movement of the body bolster bearing.

Fig. 4 is a top plan view showing the body bearing and eccentrically mounted bolts at its opposite ends for adjustment purposes.

Fig. 5 is a side view thereof, showing the bolts and their eccentric mountings attaching the body bearing to the body bolster.

Fig. 6 is a cross sectional view of the housing of the rollers, and

Fig. 7 is a sectional view of the body bearing.

Referring now more particularly to the several views, there is shown in Fig. 1, a fragmentary portion of a truck bolster 1, on which there is mounted a side bearing housing 2, with the rollers 3 therein, this housing and rollers being of the well known "Wine" type and illustrated and described in an application for U. S. patents filed by me on the 15th day of March, 1926, and bearing Serial Number 94,751, U. S. Patent No. 1,655,486, Jan. 10, 1928.

It might be understood, however, at this point that it is not necessary that a certain or particular form of truck bolster bearing be used with the body bolster, but any preferred form that is provided with rollers may be used in cooperation with the body bolster bearing, which latter forms the gist of the present invention.

It will also be understood that the housing 2 is to be securely bolted to the truck bolster and is not designed to be changed in its position.

Referring now to the gist of the invention, there will be seen in the several views, a fragmentary portion 4 of a body bolster, and although only one sloping portion of the bolster is illustrated, it will be understood that the other end of the bolster is similar to the portion 4 shown, but oppositely disposed.

It might be well to mention here that my adjustable form of side bearing shown (body bolster portion) takes advantage of the natural slope of the bolster, so that the bolster bearing may be adjusted upwardly and downwardly along the slope.

Referring now more particularly to Figs. 2, 4, and 7, there is shown a casting which forms the body bearing 5, which bearing has an inclined upper surface and a flat base 6, to which in turn is riveted the wear plate 7.

It will be noticed that the base 6 and wear plate 7 of the casting are to be positioned parallel with the surface of the rollers and, as this casting is substantially wedge shape or has an inclined upper surface, it will be understood that as this bearing is moved upwardly and downwardly of the sloping bolster 4, the base and wear plate will always be parallel to the upper surface of the rollers 3.

Extending outwardly from the wedge shape casting at its opposite ends are the two wings 8, which wings or projections are flush with the upper surface of the casting and are inclined with relation to the base 6 and wear plate 7 and corresponding with inclined part of the bolster.

The casting is cored or provided with the pockets or chambers 9, leaving the center rib 10, while in the bottom of the pockets are positioned the rivets 11 that secure the wear plate 7 in place.

So far this body bearing is similar to the bearing shown in the companion case, filed by me on February 23rd, 1927, and bearing Serial Number 170,389, U. S. Patent No. 1,664,445, April 3, 1928, but the manner of adjusting this bearing is different and will now be described.

In the wings 8 there are cut two large circular openings 8a, which are diametrically opposite each other and fitting within each of these circular openings there is positioned a circular plate 12 having a head 13, which is hexagonal in shape to form a nut, so that a wrench (not shown) may be applied thereto.

Passing through each of these plates is an opening 14, so that a bolt 15 may be passed therethrough while lock nuts 16 are shown for holding the bolt in position, the bolts being designed to also pass through the bolster 4.

The position of the holes 14 in these plates is important and it will be noticed that the said holes are near the rim or periphery of each of the plates. In other words the bolts and holes are eccentrically positioned with relation to their respective circular plates.

Supposing it is desired to move the body bearing with relation to the rollers, it will first be necessary to loosen the respective nuts 16 and then place a wrench on each of the heads 13 and turn the plates in unison with each other. The eccentric position of the bolts as these plates are turned will either cause the body bearing to advance up the slope of the bolster or if the plates are turned in the opposite direction, the body bearing will be caused to move downwardly of the bolster 4.

Of course the bearing will move slightly lengthwise as well as upwardly and downwardly of the bolster, due to the eccentric mounting of the bolts, but the greatest motion of course will be in the upward and downward direction. The limit of movement of course will be the diameter of the circles minus of course twice the distance from the center of the pin to the periphery of the circle.

After the body bearing is thus adjusted so that the clearance between the rollers and the wear plate is correct, the lock nuts will be pulled up tightly and the body bearing will keep this position until it is again adjusted.

From the foregoing it will be seen that I have provided a side bearing wherein the bolster bearing may be correctly positioned to provide the proper clearance between it and the rollers and wherein if the body bolster settles or conditions are such that the clearance is too great or too small, it is only necessary to loosen the two lock nuts and turn the plates with the eccentrically mounted bolts therein to thus raise or lower slightly the body bearing with relation to the truck bearing.

Having thus described my invention what I claim as new and desire to secure by Letters Patent is:

A side bearing comprising a truck bearing and a body bearing, the body bearing adapted to be secured to the bottom sloping wall of a bolster and the said body bearing having wings extending out beyond the body portion of the bearing and lying parallel with the bolster, the said body of the bearing adapted to lie in a horizontal plane, the said wings each provided with a circular opening, circular plates located in these openings and said plates free to turn in said openings without being moved inwardly or outwardly of said openings, bolts eccentrically mounted in said plates, the bolts adapted to be secured to the body bolster and said bolts extending at right angles to the said sloping wall of the body bolster and to the body bearing, said plates when turned capable of adjusting the body bearing with relation to the height of the truck bearing, said bolts being shorter in length than the depth of the body bearing, and means on the bolts for locking the circular plates in the openings.

In testimony whereof I affix my signature.

WILLIAM E. WINE.